United States Patent
Ogawa et al.

(10) Patent No.: US 12,165,078 B2
(45) Date of Patent: Dec. 10, 2024

(54) MACHINE LEARNING APPARATUS, CONTROL DEVICE, MACHINING SYSTEM, AND MACHINE LEARNING METHOD FOR LEARNING CORRECTION AMOUNT OF WORKPIECE MODEL

(71) Applicant: FANUC CORPORATION, Yamanashi (JP)

(72) Inventors: Kenichi Ogawa, Yamanashi (JP); Takashi Nagatomi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1024 days.

(21) Appl. No.: 17/105,609

(22) Filed: Nov. 26, 2020

(65) Prior Publication Data
US 2021/0174227 A1    Jun. 10, 2021

(30) Foreign Application Priority Data
Dec. 10, 2019  (JP) ................ 2019-222979

(51) Int. Cl.
G05B 13/02 (2006.01)
G05B 19/4097 (2006.01)
G06N 5/04 (2023.01)
G06N 20/00 (2019.01)

(52) U.S. Cl.
CPC .......... *G06N 5/04* (2013.01); *G05B 13/0265* (2013.01); *G05B 19/4097* (2013.01); *G06N 20/00* (2019.01)

(58) Field of Classification Search
CPC .................. G05B 13/0265; G05B 19/4097
USPC ....................................................... 700/47
See application file for complete search history.

(56) References Cited

U.S. PATENT DOCUMENTS

| | | | |
|---|---|---|---|
| 8,706,281 B2 | 4/2014 | Lettenbauer et al. | |
| 2011/0130854 A1* | 6/2011 | Lettenbauer | G06T 17/30 700/98 |
| 2017/0031328 A1* | 2/2017 | Sawada | G05B 13/028 |
| 2017/0090459 A1* | 3/2017 | Koga | G06N 20/00 |
| 2017/0091667 A1* | 3/2017 | Yukawa | G06N 3/042 |
| 2019/0317472 A1* | 10/2019 | Zhi | G05B 19/402 |

FOREIGN PATENT DOCUMENTS

| | | |
|---|---|---|
| CN | 104057363 A | 9/2014 |
| CN | 110069041 A | 7/2019 |
| CN | 110394448 A | 11/2019 |
| JP | H09-295022 A | 11/1997 |
| JP | 2000-084607 A | 3/2000 |

(Continued)

*Primary Examiner* — Jigneshkumar C Patel
(74) *Attorney, Agent, or Firm* — HAUPTMAN HAM, LLP

(57) ABSTRACT

A machine learning apparatus capable of reducing an error between a machined workpiece and a target shape when the workpiece is machined based on a workpiece model modeling the target shape of the workpiece. A machine learning apparatus includes a state observation section configured to observe machining state data of a machine tool configured to machine the workpiece, and measurement data of an error between a shape of the workpiece machined by the machine tool based on the workpiece model and the target shape, as a state variable representing a current state of environment in which the workpiece is machined, and a learning section configured to learn the correction amount in association with the error by using the state variable.

9 Claims, 10 Drawing Sheets

(56) References Cited

FOREIGN PATENT DOCUMENTS

| | | | |
|---|---|---|---|
| JP | 2003-094291 | A | 4/2003 |
| JP | 200764910 | A | 3/2007 |
| JP | 2011-528829 | A | 11/2011 |
| JP | 2017-030067 | A | 2/2017 |
| JP | 2018-065211 | A | 4/2018 |
| JP | 2019-025561 | A | 2/2019 |

* cited by examiner

MACHINE LEARNING APPARATUS, CONTROL DEVICE, MACHINING SYSTEM, AND MACHINE LEARNING METHOD FOR LEARNING CORRECTION AMOUNT OF WORKPIECE MODEL

RELATED APPLICATIONS

The present application claims priority to Japanese Application Number 2019-222979, filed Dec. 10, 2019, the disclosure of which is hereby incorporated by reference herein in its entirety.

BACKGROUND OF THE INVENTION

1. Field of the Invention

The present invention relates to a machine learning apparatus, a control device, a machining system, and a machine learning method for learning a correction amount of a workpiece model.

2. Description of the Related Art

A machine learning apparatus for learning an operation of a robot is known (e.g., JP 2017-064910 A). When a workpiece is machined based on a workpiece model obtained by modeling a target shape of the workpiece, an error may occur between the machined workpiece and the target shape. In the related art, a technique for reducing such an error has been demanded.

SUMMARY OF THE INVENTION

In an aspect of the present disclosure, a machine learning apparatus, which is configured to learn a correction amount by which a workpiece model modeling a workpiece is to be corrected in order for a shape of the workpiece machined based on the workpiece model to coincide with a target shape, includes a state observation section configured to observe machining state data of a machine tool configured to machine the workpiece, and measurement data of an error between the target shape and a shape of the workpiece machined by the machine tool based on the workpiece model, as a state variable representing a current state of environment in which the workpiece is machined; and a learning section configured to learn the correction amount in association with the error, using the state variable.

In another aspect of the present disclosure, a machine learning method of learning a correction amount by which a workpiece model modeling a workpiece is to be corrected in order for a shape of the workpiece machined based on the workpiece mode to coincide with a target shape, includes observing machining state data of a machine tool configured to machine the workpiece, and measurement data of an error between the target shape and a shape of the workpiece machined by the machine tool based on the workpiece model, as a state variable representing a current state of environment in which the workpiece is machined; and learning the correction amount in association with the error, using the state variable.

According to the present disclosure, an optimal correction amount of a workpiece model for reducing an error can be determined automatically by using a learning result of the learning section. When a correction amount can be determined automatically, an optimal correction amount can be determined quickly from machining state data. Accordingly, a task of determining a correction amount under various machining conditions can be simplified significantly. In addition, since learning of a correction amount is performed based on a huge data set, a correction amount optimal for reducing an error can be determined with high precision.

DETAILED DESCRIPTION

Figure 1:
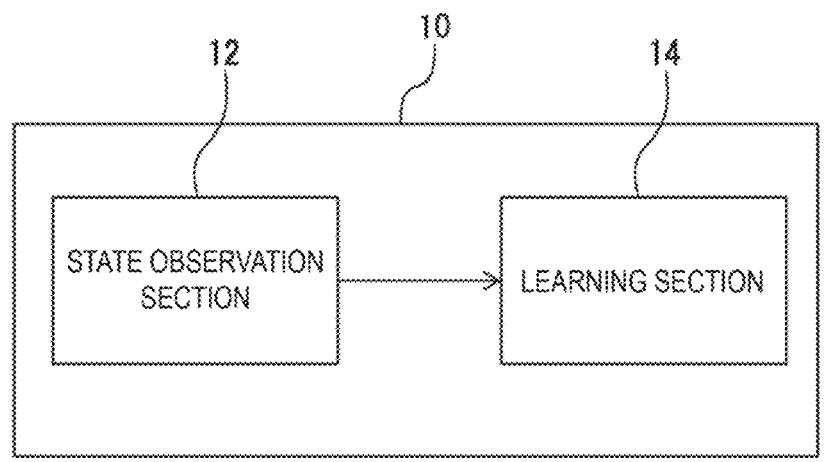
FIG. 1 is a block diagram of a machine learning apparatus according to an embodiment.

Hereinafter, embodiments of the present disclosure will be described in detail with reference to the drawings. Note that, in various embodiments described below, similar elements are denoted by the same reference numeral, and redundant descriptions thereof will be omitted. First, a machine learning apparatus 10 according to an embodiment will be described with reference to FIG. 1. The machine learning apparatus 10 is an apparatus for learning a correction amount C, by which a workpiece model WM which models a workpiece N is to be corrected in order for a shape of the workpiece N, which is machined by a machine tool 100 (FIG. 2) based on the workpiece model WM, to coincide with a predetermined target shape.

Hereinafter, the machine tool 100 according to an embodiment will be described with reference to FIG. 2. The machine tool 100 includes a base table 102, a translational movement mechanism 104, a support base 106, a swinging movement mechanism 108, a swinging member 110, a rotational movement mechanism 112, a work table 114, a spindle head 116, a tool 118, and a spindle movement mechanism 120.

The base table 102 includes a base plate 122 and a pivot-support portion 124. The base plate 122 is a substantially rectangular flat-plate member, and disposed on the translational movement mechanism 104. The pivot-support portion 124 is formed integrally with the base plate 122 so as to protrude upward from a top face 122a of the base plate 122.

The translational movement mechanism 104 moves the base table 102 in an x-axis direction and a y-axis direction of a machine coordinate system CM. Specifically, the translational movement mechanism 104 includes an x-axis ball screw mechanism that moves the base table 102 in the x-axis direction of the machine coordinate system CM, a y-axis ball screw mechanism that moves the base table 102 in the y-axis direction of the machine coordinate system CM, a servo motor that drives the x-axis ball screw mechanism, and a servo motor that drives the y-axis ball screw mechanism (all not illustrated).

The support base 106 is fixed on the base table 102. Specifically, the support base 106 includes a base portion 126 and a motor housing portion 128. The base portion 126 is a hollow member having a substantially quadrangular prism shape, and is fixed on the top face 122a of the base plate 122 so as to protrude upward from the top face 122a. The motor housing portion 128 is a substantially semicircular hollow member, and is formed integrally with an upper end of the base portion 126. The swinging movement mechanism 108 includes e.g. a servo motor, and is installed inside of the base portion 126 and the motor housing portion 128. The swinging movement mechanism 108 rotates the swinging member 110 around an axis A1.

The swinging member 110 is rotatably supported by the support base 106 and the pivot-support portion 124. Specifically, the swinging member 110 includes a pair of holding portions 130 and 132 disposed opposite to each other in the x-axis direction of the machine coordinate system CM, and a motor housing portion 134 fixed to the holding portions 130 and 132. The holding portion 130 is mechanically connected to the swinging movement mechanism 106 (specifically, an output shaft of the servo motor), while the holding portion 132 is pivotally supported by the pivot-support portion 124 via a support shaft (not illustrated). The motor housing portion 134 is a substantially cylindrical hollow member, and formed integrally with the holding portions 130 and 132 so as to be disposed between the holding portions 130 and 132.

The rotational movement mechanism 112 includes e.g. a servo motor, and is installed inside of the motor housing portion 134. The rotational movement mechanism 112 rotates the work table 114 around an axis A2. The axis A2 is orthogonal to the axis A1, and rotates around the axis A1 together with the swinging member 110. The work table 114 is a substantially circular-plate member, on which the workpiece W is to be set via a jig (not illustrated). The work table 114 is mechanically coupled to the rotational movement mechanism 112 (specifically, an output shaft of the servo motor).

The spindle head 116 is provided to be movable in the z-axis direction of the machine coordinate system CM, wherein the tool 118 is detachably attached to a tip of the spindle head 116. The spindle head 116 rotates the tool 118 around an axis A3, and machines the workpiece W set on the work table 114 by the rotating tool 118. The axis A3 is orthogonal to the axis A1. The spindle movement mechanism 120 includes e.g. a ball screw mechanism that reciprocates the spindle head 116 in the z-axis direction of the machine coordinate system CM, and a servo motor that drives the hall screw mechanism (both not illustrated). The spindle movement mechanism 120 moves the spindle head 116 in the z-axis direction of the machine coordinate system CM.

The machine coordinate system CM is set for the machine tool 100. The machine coordinate system CM is a control coordinate system fixed in a three-dimensional space, and serves as a reference in controlling an operation of the machine tool 100. In the present embodiment, the machine coordinate system CM is set such that the x-axis thereof is parallel to the rotational axis A1 of the swinging member 110 and the z-axis thereof is parallel to the vertical direction.

The machine tool 100 moves the tool 118 relative to the workpiece W set on the work table 114 in five axis directions, by means of the translational movement mechanism 104, the swinging movement mechanism 108, the rotational movement mechanism 112, and the spindle movement mechanism 120. Accordingly, the translational movement mechanism 104, the swinging movement mechanism 108, the rotational movement mechanism 112, and the spindle movement mechanism 120 constitute a movement mechanism 136 configured to move the tool 118 and the workpiece W relative to each other.

Figure 3:
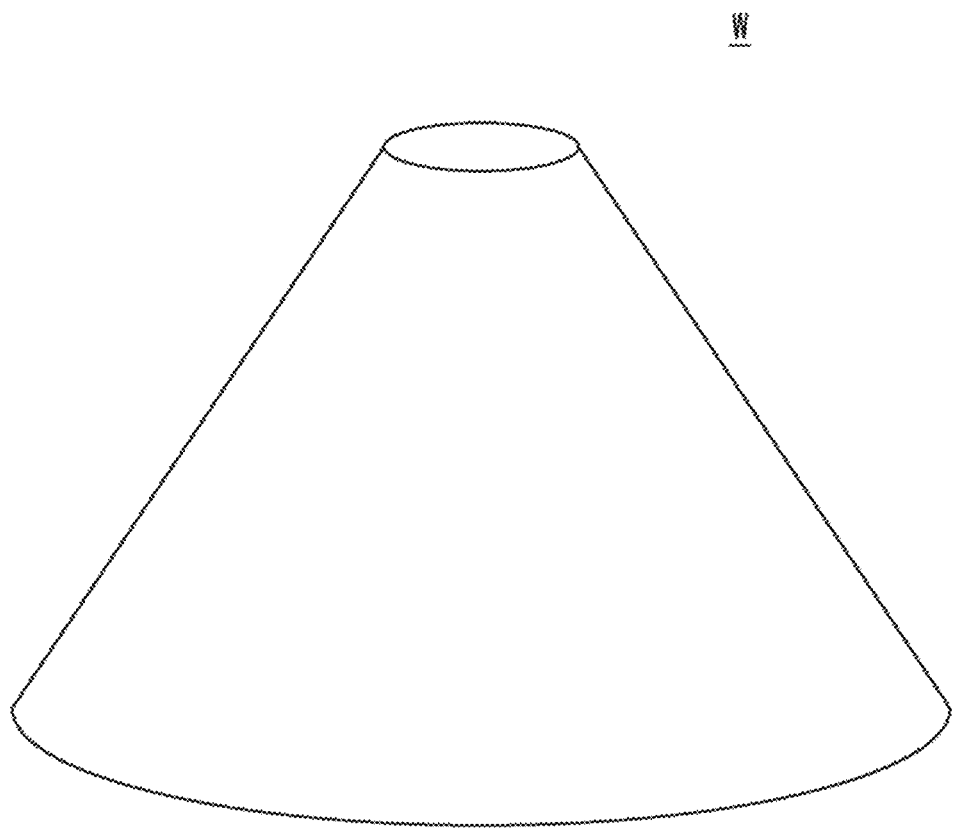
FIG. 3 illustrates an example of a workpiece produced by the machine tool illustrated in FIG. 2.

The machine tool 100 is operated in accordance with a machining program MP so as to machine a workpiece-base-material by the tool 118 rotated by the spindle head 116 while moving the tool 118 and the workpiece W relative to each other by the movement mechanism 136, thereby forming the workpiece W. FIG. 3 illustrates an example of the workpiece W machined by the machine tool 100.

Figure 4:
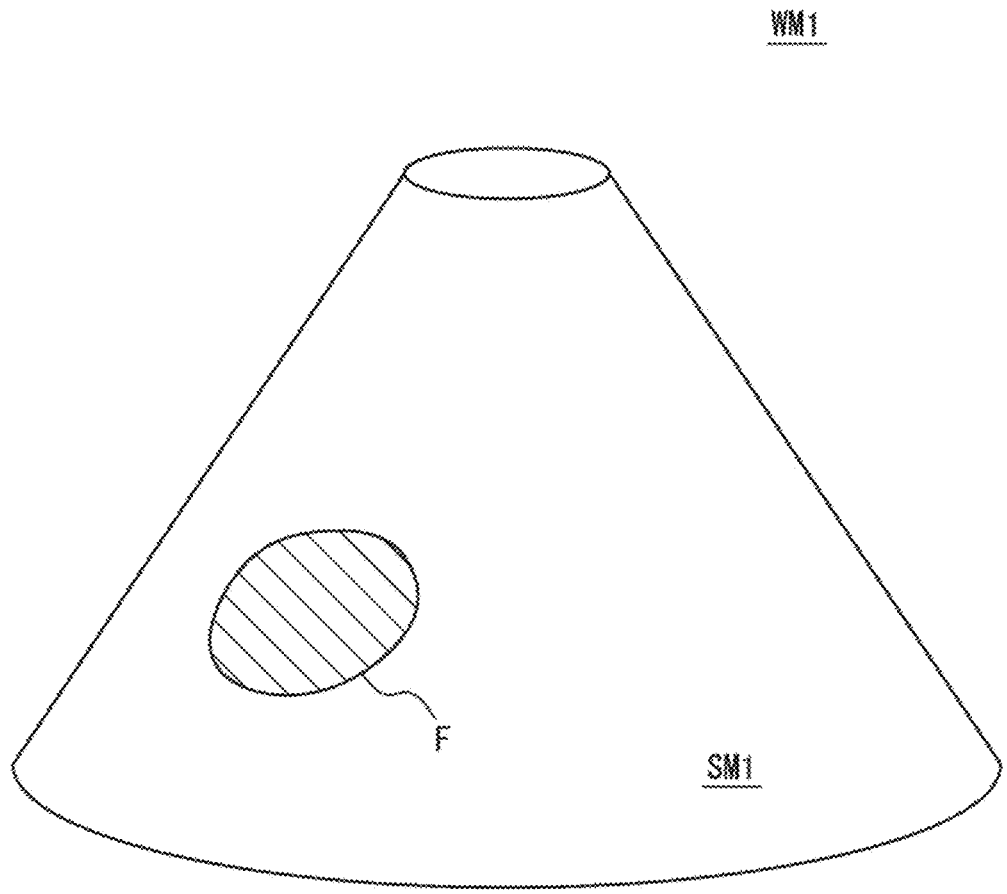
FIG. 4 illustrates a workpiece model obtained by modeling a target shape of the workpiece illustrated in FIG. 3.

When generating the machining program MP, an operator first creates a workpiece model WM1 that models a target shape of the workpiece W to be a product, using a drawing device such as a CAD. FIG. 4 illustrates an example of the workpiece model WM1. A model coordinate system CW is set in a three-dimensional virtual space in which the drawing device creates a model, and a surface model SM1 constituting the workpiece model WM1 is defined by a model point or a model line set in the model coordinate system CW.

Next, an operator inputs the created workpiece model WM1 to a program generation device such as a CAM, and the program generation device generates a machining program MP1 based on the workpiece model WM1. The machine tool 100 is operated in accordance with the machining program MP1 so as to machine a workpiece-base-material, and as a result, the workpiece W is formed.

In this case, an error may occur between a shape of the workpiece W actually formed and the target shape (i.e., the workpiece model WM1) of the workpiece W. As a measure for canceling such an error, an operator may manually correct the workpiece model WM1 by operating the drawing device, and re-generate the machining program MP based on the corrected workpiece model by means of the program generation device.

The machine learning apparatus 10 according to the present embodiment automatically learns a correction amount C by which the workpiece model WM1 is to be corrected in order to cancel the error. The machine learning apparatus 10 may be comprised of a computer including a processor (a CPU, a GPU, etc.) and a memory (a ROM, a RAM, etc.), or software such as a learning algorithm.

As illustrated in FIG. 1, the machine learning apparatus 10 includes a state observation section 12 and a learning section 14. The state observation section 12 observes machining state data CD of the machine tool 100, and measurement data of an error δ between the target shape and a shape of the workpiece W machined by the machine tool 100 based on the workpiece model WM, as a state variable SV representing a current state of environment in which the workpiece W is machined.

The machining state data CD is data of a parameter that may affect machining precision of the machine tool 100, and includes e.g. at least one of a dimensional error of the machine tool 100, temperature T1 of the machine tool 100, ambient temperature T2 around the machine tool 100, a heat amount Q of the machine tool 100, power consumption P of the machine tool 100, thermal displacement amount $\xi$ of the machine tool 100, and an operation parameter OP of the machine tool 100.

The dimensional error E includes e.g. deviation E1 between the axis A1 and the axis A2. In this regard, the rotational axis A1 of the swinging member 110 and the rotational axis A2 of the work table 114 are designed to be orthogonally intersected with each other, as design dimension. However, actually in the machine tool 100, the axis A1 and the axis A2 may not be intersected and deviate from each other. Such deviation E1 may cause degradation in the machining precision of the machine tool 100. The deviation E1 is measured in advance by a deviation measuring device, and made to be data of a vector (distance and direction) in the machine coordinate system CM.

In addition, the dimensional error E may include e.g. an inclination angle E2 of the axis A1 with respect to the x-axis of the machine coordinate system CM, an inclination angle E3 of the axis A3 with respect to the z-axis of the machine coordinate system CM, and an inclination angle E4 of an actual movement path of the base table 102 with respect to the x-axis or the y-axis of the machine coordinate system CM. These inclination angles E2, E3, and E4 are also measured by the deviation measuring device, and made to be data of vectors (angles and inclination directions) in the machine coordinate system CM.

The temperature T1 of the machine tool 100 is temperature of a component of the machine tool 100 (i.e., the base table 102, the translational movement mechanism 104, the support base 106, the swinging movement mechanism 108, the swinging member 110, the rotational movement mechanism 112, the work table 114, the spindle head 116, the tool 118, and the spindle movement mechanism 120). The temperature T1 of the machine tool 100 can be measured by a first temperature sensor provided at the component of the machine tool 100 during or after machining.

For example, the first temperature sensor is attached to a member that tends to be thermally displaced, such as the x-axis or y-axis ball screw shaft of the translational movement mechanism 104, the output shaft of the servo motor of the swinging movement mechanism 108 or the rotational movement mechanism 112, or the ball screw shaft of the spindle movement mechanism 120 of the machine tool 100, and measures the temperature T1 of the member during or after machining by the machine tool 100. The ambient temperature T2 is measured by a second temperature sensor installed outside the machine tool 100. The second temperature sensor measures the ambient temperature (i.e., atmospheric temperature) T2 before, during, or after machining by the machine tool 100.

The heat amount Q indicates a heat amount accumulated in the component (e.g., the ball screw shaft) of the machine tool 100 during machining. As an example, the above-described first temperature sensor measures temperature T1_1 before machining by the machine tool 100, and subsequently, measures temperature T1_2 at a predetermined time point during machining (or an end time point of machining) by the machine tool 100. The heat amount Q can be obtained from a difference $\Delta T$ between the temperatures T1_1 and T1_2 (i.e., $\Delta T = T1\_2 - T1\_1$) and heat capacity B of the component of the machine tool 100, using an equation: $Q = B \times \Delta T$. Note that the heat amount Q may be measured by a calorimeter provided at the machine tool 100.

The power consumption P is e.g. electric power consumed by (or input to) the machine tool 100 from the start to the end of machining by the machine tool 100. Specifically, the electric power (or current or voltage) input to all the servo motors and spindle motors provided in the machine tool 100 is measured by a power meter (or an ammeter or a voltmeter), and the power consumption P can be measured from the measured value. Alternatively, the power consumption P may be power consumption of each of a plurality of the servo motors (five in the present embodiment) and one or more of the spindle motors (one in the present embodiment) provided in the machine tool 100.

The thermal displacement amount $\xi$ indicates a displacement amount by which the component (e.g., the ball screw shaft) of the machine tool 100 is displaced (e.g., thermally expanded) due to heat generated during machining. As an example, the thermal displacement amount $\xi$ can be estimated by calculation, by introducing the above-described heat amount Q into a known empirical formula. As another example, the thermal displacement amount $\xi$ may be actually measured during or after machining by the machine tool 100, using a displacement measuring device (a displacement meter, a linear scale, or the like).

The operation parameter OP includes at least one of acceleration $\alpha$ of the movement mechanism 136 (specifically, the translational movement mechanism 104, the swinging movement mechanism 108, the rotational movement mechanism 112, or the spindle movement mechanism 120), a time constant $\tau$ that determines a time necessary for acceleration or deceleration of the movement mechanism 136, a control gain G that determines a response speed of control for the movement mechanism 136, and a moment of inertia M of the movement mechanism 136.

For example, as the operation parameter OP, the acceleration $\alpha$, the time constant $\tau$, the control gain G, and the moment of inertia M of each servo motor of the translational movement mechanism 104, the swinging movement mechanism 108, the rotational movement mechanism 112, and the spindle movement mechanism 120 may be acquired, respectively. Note that, as the acceleration $\alpha$, acceleration in the x-axis direction and the y-axis direction of the base table 102 moved by the translational movement mechanism 104 may be acquired. The operation parameter OP is predetermined by an operator, and defined in the machining program MP.

The error $\delta$ can be measured by a measuring device such as a three-dimensional scanner including a stereo camera, or a three-dimensional measuring apparatus. Specifically, the shape of the workpiece W that has been machined by the machine tool 100 is measured by the measuring device, and then the error $\delta$ between the shape of the workpiece W and the target shape can be measured based on the measurement result by the measuring device and the dimensional information of the target shape (workpiece model WM1). Note that the measuring device may be configured to receive an input of the workpiece model WM1, and calculate the error $\delta$ between the actually measured shape of the workpiece W and the shape of the workpiece model WM1.

Figure 5:
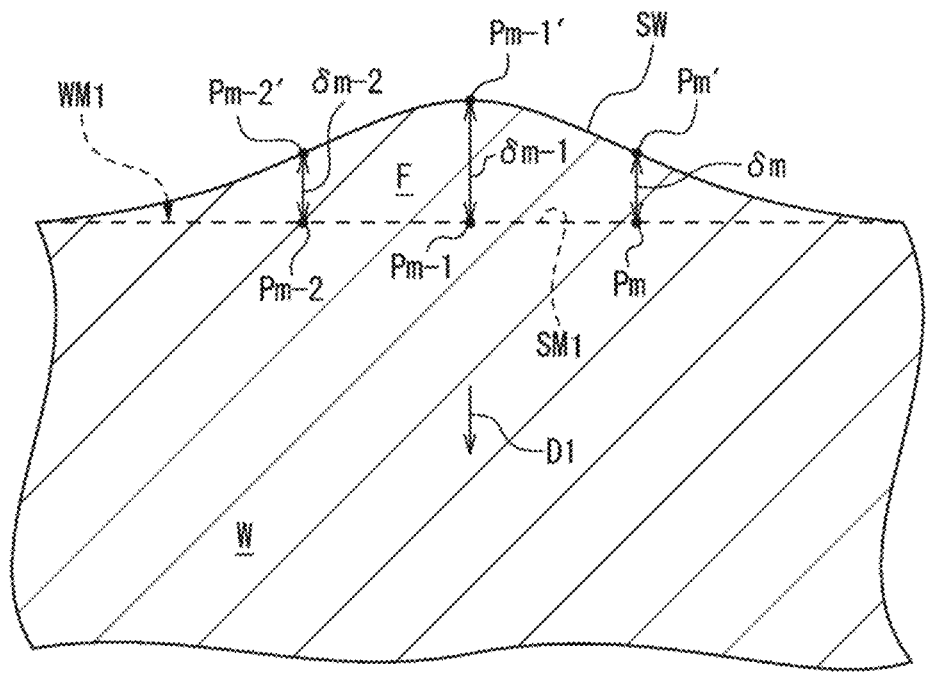
FIG. 5 is an explanatory view of an error between the workpiece model illustrated in FIG. 4 and a machined workpiece, and illustrates a case where the error is a protrusion error caused by the workpiece protruding with respect to the workpiece model.
Figure 6:
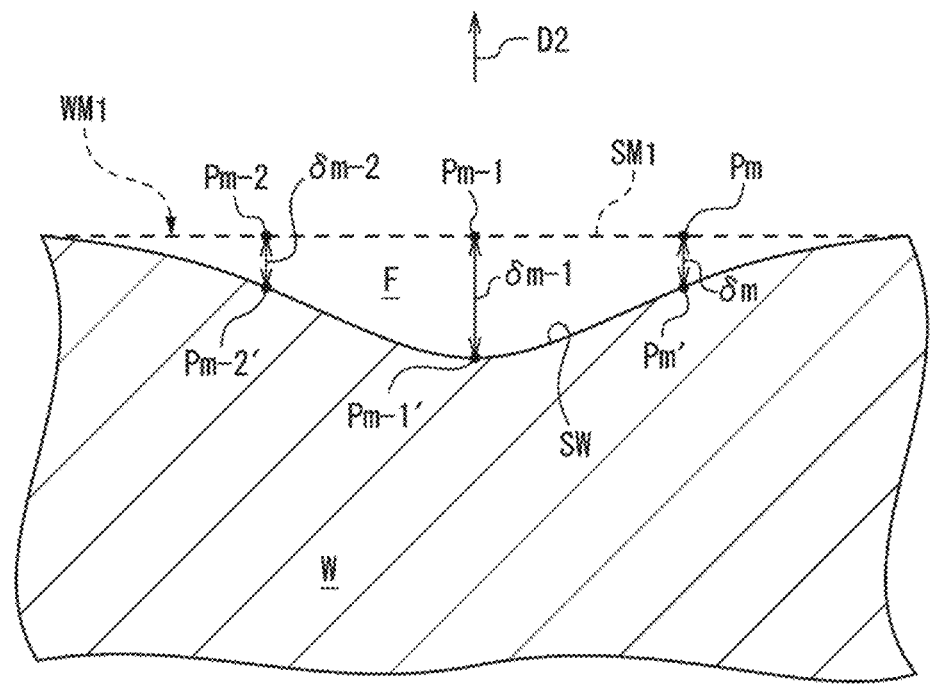
FIG. 6 is an explanatory view of an error between the workpiece model illustrated in FIG. 4 and a machined workpiece, and illustrates a case where the error is a dent error caused by the workpiece being dented with respect to the workpiece model.

Hereinafter, the error $\delta$ will be described with reference to FIGS. 4 to 6. FIG. 4 illustrates a region F of the workpiece model WM1 where the error $\delta$ occurs between the target shape (workpiece model WM1) and the shape of the machined workpiece W which is measured by the measuring device. For example, as illustrated in FIG. 5, the region F is a region where a surface SW of the machined workpiece W protrudes outward with respect to a surface model SM1 of the workpiece model WM1 corresponding to the surface SW. Alternatively, as illustrated in FIG. 6, the region F is a region where the surface SW of the machined workpiece W is recessed inward with respect to the surface model SM1 of the workpiece model WM1 corresponding to the surface SW.

As an example, the error δ includes a plurality of errors δm between a plurality of measurement points Pm (m=1, 2, 3, . . . ) predetermined on the workpiece model WM1 and a plurality of measurement points Pm' on the machined workpiece W corresponding to the plurality of measurement points Pm. In this case, the measuring device measures the shape of the machined workpiece W at the plurality of measurement points Pm' on the machined workpiece W. As another example, the error δ may be a maximum value δmax of the plurality of errors δm, a sum δS (=Σδm) of the plurality of errors δm, or an average value δA (=(Σδm)/m) of the plurality of errors δm.

As still another example, the error δ may be volume δV of the region F between the surface SW and the surface model SM1 (i.e., an integration value of the errors in the region F). In this case, the measuring device may generate a machined workpiece model MM modeling the machined workpiece W, based on the measured value of the shape of the machined workpiece W. The volume δV can be obtained based on the machined workpiece model MM and the workpiece model WM1. The state observation section 12 observes, as the state variable SV, the machining state data CD and the measurement data of the error δ described above.

The learning section 14 learns the correction amount C of the workpiece model WM1 in accordance with any learning algorithm generally referred to as machine learning. Specifically, when the error δ between the target shape (workpiece model WM1) and the shape of the workpiece W machined by the machine tool 100 in accordance with the machining program MP1 is measured, the drawing device corrects the workpiece model WM1 by the correction amount C, thereby creating a new workpiece model WM2. Note that the correction amount C is expressed as a vector (a magnitude and the direction) in the model coordinate system CW.

Then, the program generation device generates a machining program MP2 based on the workplace model WM2, and the machine tool 100 machines a workpiece-base-material in accordance with the machining program MP2 so as to form the workpiece W. The measuring device again measures measurement data of an error δ between a shape of the machined workplace W and the target shape. Each time such a trial of correcting the workpiece model WM1 and machining based on the corrected workpiece model WM2 is repeated, the state observation section 12 observes the state variable SV, and the learning section 14 repeatedly executes learning based on a data set including the state variables SV.

By repeating this learning cycle, the learning section 14 can automatically identify a feature that implies a correlation between the correction amount C and the error δ. Although the correlation between the correction amount C and the error δ is substantially unknown at the start of the learning algorithm, the learning section 14 interprets the correlation by gradually identifying the feature as it advances the learning.

When the correlation between the correction amount C and the error δ is interpreted to a certain reliable level, the learning result repeatedly output by the learning section 14 can be used for selecting an action (i.e., making a decision) as to how much the workpiece model WM1 is to be corrected in order to reduce the error δ when the workpiece W in the current state is machined.

As described above, in the machine learning apparatus 10, the learning section 14 learns the correction amount C of the workpiece model WM1 in accordance with the machine learning algorithm, using the state variable SV (the machining state data CD and the measurement data δ) observed by the state observation section 12. According to the machine learning apparatus 10, it is possible to automatically obtain the correction amount C optimal for reducing the error δ, by making use of the learning result of the learning section 14.

If the correction amount C can be obtained automatically, it is possible to quickly decide the optimal correction amount C from the machining state data CD. Accordingly, a task of obtaining the correction amount C under various machining conditions can be significantly simplified. In addition, since learning of the correction amount C can be performed based on huge data sets, it is possible to accurately obtain the correction amount C optimal for reducing the error δ.

Note that the state observation section 12 may further observe identification information for identifying the machining program MP (e.g., a program name, a program identification number, etc.), as the state variable SV. When the machine learning apparatus 10 is comprised of a computer, a processor of the computer carries cut arithmetic processing for realizing the functions of the state observation section 12 and the learning section 14 described above. On the other hand, when the machine learning apparatus 10 is comprised of software, the machine learning apparatus 10 causes a resource such as a processor to execute a computer program included in the software, thereby realizing the functions of the state observation section 12 and the learning section 14 described above.

Figure 7:
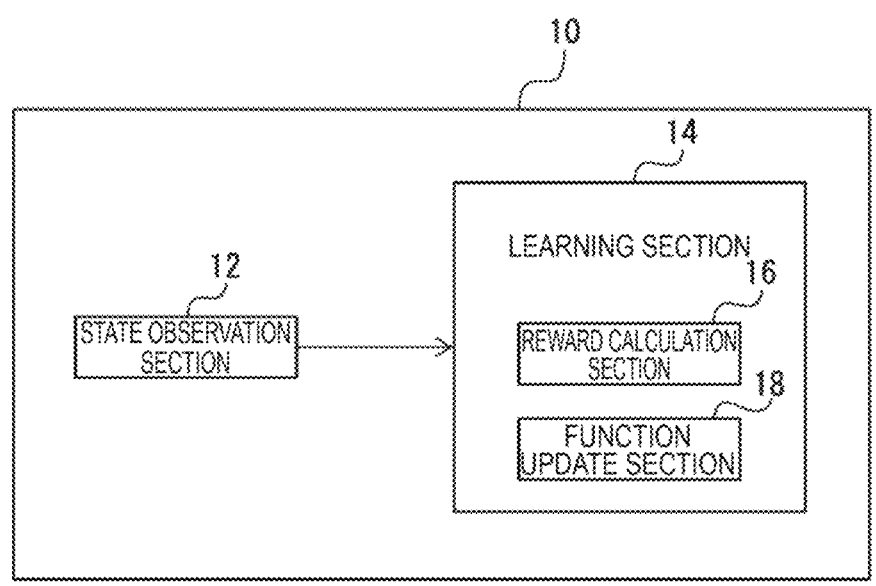
FIG. 7 is a block diagram of a machine learning apparatus according to another embodiment.

In the machine learning apparatus 10, the learning algorithm executed by the learning section 14 is not particularly limited. For example, a learning algorithm known as machine learning, such as supervised learning, unsupervised learning, reinforcement learning, or a neural network, can be employed. FIG. 7 illustrates an embodiment of the machine learning apparatus 10, which includes the learning section 14 configured to execute the reinforcement learning as an example of the learning algorithm.

The reinforcement learning is a method in which a cycle of observing a current state (i.e., input) of environment in which a learning target exists, carrying our an action. (i.e., output) in the current state, and giving some reward to the action is repeated in a trial-and-error manner, and a strategy (correction amount C in the present embodiment) is learned as an optimal solution so as to maximize the total rewards.

In the machine learning apparatus 10 illustrated in FIG. 7, the learning section 14 includes a reward calculation section 16 configured to obtain a reward R relating to the error δ, and a function update section 18 configured to update a function EQ representing a value of the correction amount C, using the reward R. The learning section 14 learns the correction amount C by the function update section 18 repeatedly updating the function EQ.

Hereinafter, an example of an algorithm of reinforcement learning executed by the learning section 14 will be described. The algorithm according to this example is known as Q-learning, and Q-learning is a method in which a state "s" of an action subject and an action "a" selectable by the action subject in the state "s" are used as independent variables, and the function EQ (s, a) representing an action value when the action "a" is selected in the state "s" is learned.

Selecting the action "a" by which the value function EQ is highest in the state "s" is an optimal solution. Q-learning is started in a state where a correlation between the state "s" and the action "a" is unknown, and trial-and-error of selecting various actions "a" in an arbitrary state "s" is repeated in order to repeatedly update the value function EQ, whereby approaching the optimal solution. When the environment (i.e., the state "s") changes as a result of selecting the action "a" in the state "s", a reward (i.e., weighting of the action "a") "r" in response to the change is obtained, and learning is induced to select the action "a" by which higher reward "r" is obtained, whereby the value function EQ can approach the optimal solution for a relatively short time.

An update equation of the value function EQ can generally be expressed as the following equation (1).

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In equation (1), $s_t$ and $a_t$ are a state and an action at time t, respectively, and the state changes to $s_{t+1}$ by the action $a_t$. $r_{t+1}$ is reward to be obtained when the state changes from $s_t$ to $s_{t+1}$. The term of maxQ means value Q obtained when carrying out the action "a" by which value Q becomes (or is considered at time t to be) a maximum at time t+1. $\alpha$ and $\gamma$ are a learning coefficient and a discount rate, respectively, and are arbitrarily set to $0<\alpha \leq 1$ and $0<\gamma \leq 1$, respectively.

When the learning section 14 executes Q learning, the state variable SV observed by the state observation section 12 corresponds to the state "s" of the update equation, and an action (i.e., the correction amount C) as to how much the workpiece model WM1 is to be corrected when the workpiece W in the current state is machined corresponds to the action "a" of the update equation. The reward R obtained by the reward calculation section 16 corresponds to the reward "r" of the update equation. The function update section 18 repeatedly updates, by Q-learning using the reward R, the function EQ representing a value of the correction amount C when the workpiece W in the current state is machined.

For example, the reward R obtained by the reward calculation section 16 is positive (plus) when the error δ is smaller than a predetermined threshold δth1, while the reward R is negative (minus) when the error δ is equal to or larger than the threshold δth1. Absolute values of the rewards R that are positive and negative may be the same as or different from each other.

Additionally, the reward calculation section 16 may obtain the reward R which differs in response to a magnitude or the error δ. For example, the reward calculation section 16 may give the reward R=+5 when the error δ satisfies 0≤δ<δth2 (<δth1), give the reward R=+2 when δth2≤δ<δth3 (<δth1) is satisfied, and give the reward R=+1 when δth3≤δ<δth1 satisfied.

On the other hand, the reward calculation section 16 may give the reward R=−1 when δth1≤δ<δth4 is satisfied, give the reward R=−2 when δth4<δ≤δth5 is satisfied, and give the reward R=−5 when δth5<δ is satisfied. Thus, in this case, the reward calculation section 16 obtains the reward R which becomes larger as the error δ becomes smaller. By obtaining the reward R to be weighted by the condition in this way, Q-learning can converge to an optimal solution for a relatively short time.

Further, the reward calculation section 16 may obtain the reward R which differs in response to a difference in the machining state data CD. For example, when the error δ is smaller than the threshold δth1 and the control gain. G included in the operation parameter OP of the machining state data CD is within a predetermined allowable range, the reward calculation section 16 may give the reward R that is a larger positive value. In addition, when the error δ is smaller than the threshold δth1 and the time constant included in the operation parameter OP is within a predetermined allowable range, the reward calculation section 16 may give a reward R that is a larger positive value. In this case, it is possible to advance learning of the correction amount C so as to reduce the error δ under a condition for speeding up the operation of the movement mechanism 136 of the machine tool 100.

The function update section 18 can have an action value table in which the state variable SV and the reward R are organized in association with an action value (e.g., a numerical value) represented by the function EQ. In this case, the act by the function update section 18 to update the function EQ is synonymous with the act by the function update section 18 to update the action value table.

Since a correlation between a current state of environment and the correction amount C is unknown at the start of Q-learning, various state variables SV and various rewards R are prepared in the action value table in association with randomly defined values of action values (functions EQ). The reward calculation section 16 can immediately calculate the corresponding reward R by acquiring the error δ, and a value of the calculated reward R is written in the action value table.

When Q-learning is advanced using the reward R corresponding to the error δ, learning is induced to select an action. (i.e., the correction amount C) by which the reward. R is higher. Then, in response to a state of environment (i.e., the state variable SV) that changes as a result of executing the selected action in the current state, a value of the action value (function EQ) for an action performed in the current state is rewritten, and the action value table is updated.

By repeating this update, a value of the action value (function EQ) indicated in the action value table is rewritten such that the value of the action value becomes larger as an action (correction amount C) becomes more appropriate. In this way, a correlation between the current state (error δ) of environment and an action (correction amount C) for the current state, that has been unknown, gradually becomes clear.

Figure 8:
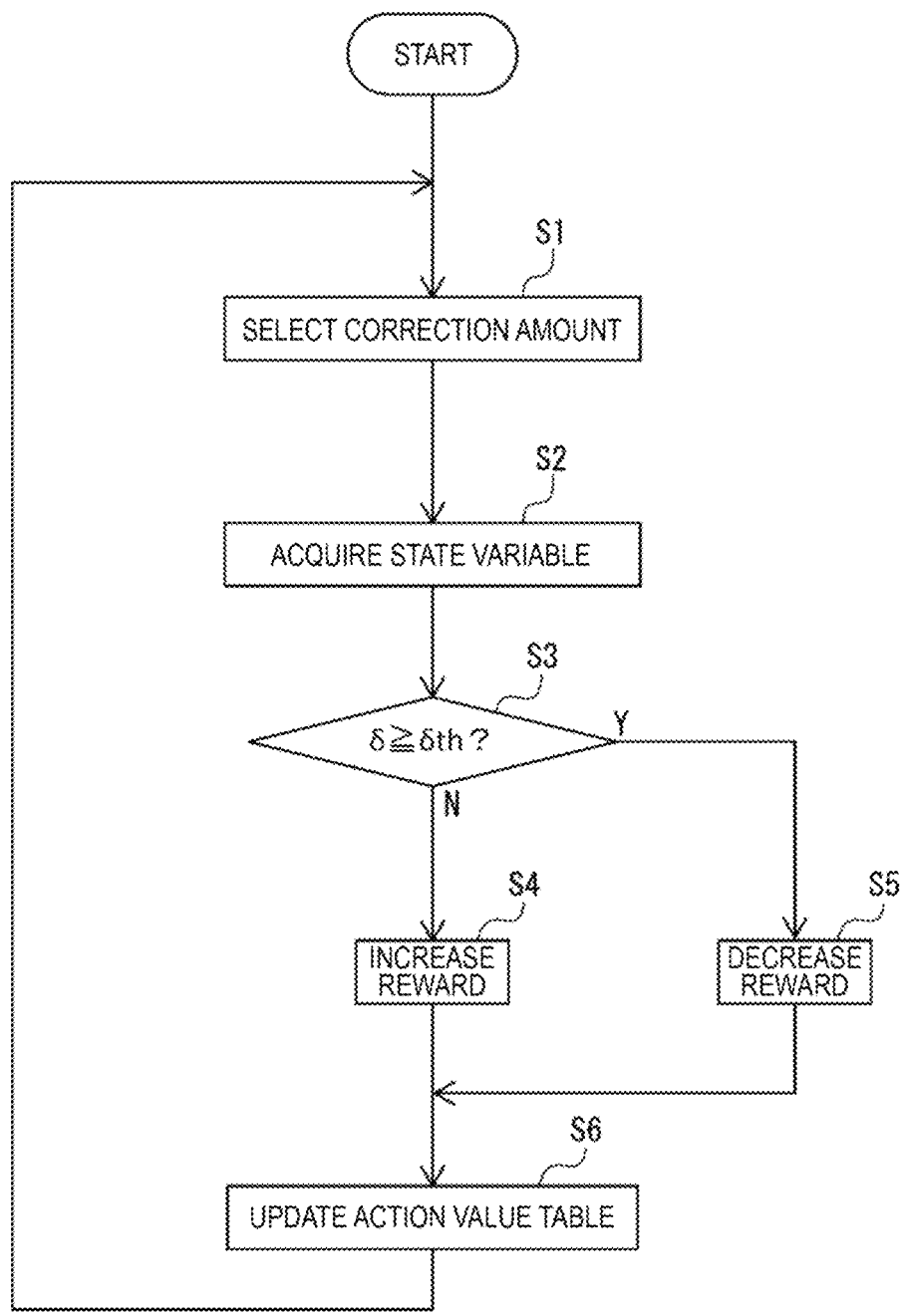
FIG. 8 illustrates an example of a flow of a learning cycle executed by the machine learning apparatus illustrated in FIG. 7.

Hereinafter, an example of a learning flow of the machine learning apparatus 10 illustrated in FIG. 7 will be described with reference to FIG. 8. The flow illustrated in FIG. 8 is started when the error δ between the target shape (workpiece model WM1) and the shape of the workpiece W machined by the machine tool 100 in accordance with the machining program MP1 is measured.

At step S1, the function update section 18 selects the correction amount C as an action to be performed in the current state, while referring to the action value table at that time. For example, the function update section 18 acquires the workpiece model WM1 from the drawing device, and acquires measurement data of the most-recently measured error δ.

Then, the function update section 18 specifies the region F (FIG. 4) on the workpiece model WM1 based on the measurement data of the error δ. Then, the function update section 18 randomly selects the correction amount C by which the component (the model point, the model line, the surface model SM1) of the workpiece model WM1 existing in the region F is to be corrected.

In this regard, the function update section 18 may be configured to randomly select the correction amount C under a predetermined condition for limiting the magnitude and the direction of the correction amount C. For example, when the error δ illustrated in FIG. 5 occurs in the region F, the function update section 18 may select a direction D1 (i.e., the opposite side to the surface SW with respect to the surface model SM1 in FIG. 5) opposite to the direction in which the error δ (protrusion error) occurs, as the direction of the correction amount C by which the surface model SM1 is to be corrected. On the other hand, when the error δ (recessed error) illustrated in FIG. 6 occurs in the region F, the function update section 18 may select a direction D2 opposite to the direction in which the error δ occurs, as the direction of the correction amount C.

In addition, the function update section 18 may select a magnitude |C| of the correction amount C within a numerical range defined based on the error δ. For example, if a maximum value of the error δ in the region F is δmax, the numerical range may be defined as 0<|C|≤δmax. Also, the function update section 18 may select a position at which the workpiece model WM1 is to be corrected by the correction amount C, as a position of the component (e.g., the model point) of the workpiece model WM1 at which the error δ of a predetermined magnitude (e.g., the maximum value δmax) occurs.

At step S2, the function update section 18 acquires the state variable SV. Specifically, when the function update section 18 selects the correction amount C at step S1, the drawing device creates the workpiece model WM2 by correcting the component (the model point, the model line, the surface model SM1) of the workpiece model WM1 by the correction amount C in the model coordinate system CW. Then, the program generation device generates the machining program MP2 based on the workpiece model WM2, and the machine tool 100 machines the workpiece W in accordance with the machining program MP2. Next, the measuring device measures the error δ between the shape of the machined workpiece W and the target shape (workpiece model WM1).

At step S2, the state observation section 12 observes, as the state variable SV, the machining state data CD when the machine tool 100 machines the workpiece W in accordance with the machining program MP2 and the measurement data of the error δ between the shape of the machined workpiece W and the target shape. The function update section 18 acquires the state variable SV observed by the state observation section 12.

At step S3, the function update section 18 determines whether or not the error δ acquired at the latest step S2 is equal to or greater than the threshold δth1. The function update section 18 determines YES when δ≤δth1 is satisfied and proceeds to step S5, while the function update section 18 determines NO when δ<δth1 is satisfied and proceeds to step S4.

At step S4, the reward calculation section 16 or a positive reward R. At this time, the reward calculation section 16 may obtain the reward R differing in response to a magnitude of the error δ (specifically, the reward that becomes larger as the error δ becomes smaller). The reward calculation section 16 applies the obtained positive reward R to the update equation of the function EQ. By giving the reward R that becomes larger as the error δ becomes smaller in this way, the learning by the learning section 14 can be guided to select an action by which the error δ becomes smaller.

At step S5, the reward calculation section 16 obtains the negative reward R, and applies it to the update equation of the function EQ. At this time, the reward calculation section 16 may obtain the negative reward R the absolute value of which becomes larger as the error δ becomes larger, as stated above. Note that, at this step S4, the reward calculation section 16 may apply the reward R=0 to the update equation of the function EQ, instead of giving the negative reward R.

At step S6, the function update section 18 updates the action value table (function EQ), using the state variable SV and the reward R in the current state. In this way, the learning section 14 repeatedly updates the action value table by repeating steps S1 to S6, and advances the learning of the correction amount C.

Figure 9:
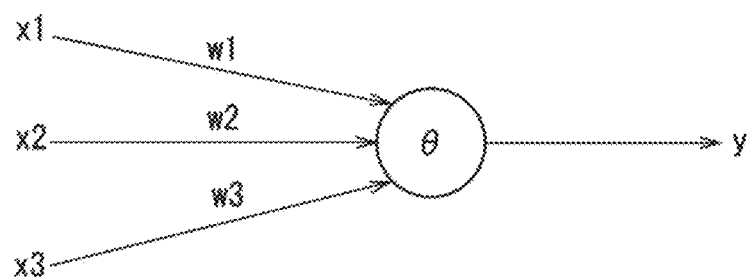
FIG. 9 schematically illustrates a model of a neuron.
Figure 10:
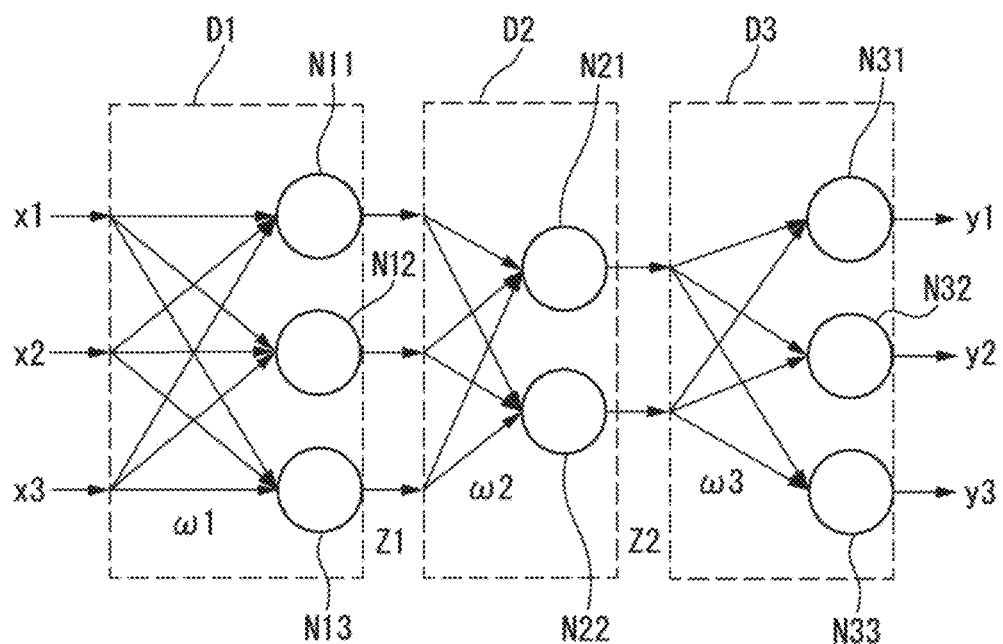
FIG. 10 schematically illustrates a model of a multilayer neural network.

When advancing the above-described reinforcement learning, a neural network can be used instead of Q-learning, for example. FIG. 9 schematically illustrates a model of a neuron. FIG. 10 schematically illustrates a model of a three layer neural network constituted by combining the neuron illustrated in FIG. 9. The neural network can be constituted by, for example, a processor and a memory that simulate a model of a neuron.

The neuron illustrated in FIG. 9 outputs a result y with respect to a plurality of kinds of input x (input x1 to x3 as an example in the figure). The individual input x (x1, x2, x3) is multiplied by a weight w (w1, w2, w3). A relationship between the input x and the result y can be expressed by the following equation (2). Note that the input x, the result y, and the weight w are all vectors. In addition, in equation (2), θ is a bias, and $f_k$ is an activation function.

$$y = f_k\left(\sum_{i=1}^{n} x_i w_i - \theta\right) \qquad (2)$$

In the three layer neural network illustrated in FIG. 10, the plurality of kinds of input x (inputs x1 to x3 as an example in the figure) are input from the left side, and the result y (results y1 to y3 as an example in the figure) are output from the right side. In the illustrated example, the input x1, x2, and x3 is multiplied by a corresponding weight (collectively represented by ω1), and the individual input x1, x2, and x3 is input to each of three neurons N11, N12, and N13.

In FIG. 10, an output of each of the neurons N11 to N13 is collectively represented by Z1. Z1 can be regarded as a feature vector obtained by extracting a feature amount of an input vector. In the illustrated example, each feature vector Z1 is multiplied by a corresponding weight (collectively represented by ω2), and the individual feature vector Z1 is input to each of two neurons N21 and N22. The feature vector Z1 represents a feature between the weight W1 and the weight W2.

In FIG. 10, respective outputs of the neurons N21 to N22 are collectively represented by Z2. Z2 can be regarded as a feature vector obtained by extracting a feature amount of the feature vector Z1. In the illustrated example, each feature vector Z2 is multiplied by a corresponding weight (collectively represented by ω3), and the individual feature vector Z2 is input to each of three neurons N31, N32, and N33. The feature vector Z2 represents a feature between the weight ω2 and the weight ω3. Finally, the neurons N31 to N33 output the results y1 to y3, respectively.

In the machine learning apparatus 10, the learning section 14 performs calculation of a multilayer structure according to the above-described neural network by using the state variable SV as the input x, and thus the correction amount C (result y) can be output. Note that an operation mode of the neural network includes a learning mode and a value prediction mode. For example, learning of the weight ω is performed by using a learning data set in the learning mode, and a value of an action can be determined in the value prediction mode by using the learned weight ω. Note that, in the value prediction mode, detection, classification, inference, or the like can also be performed.

The configuration of the machine learning apparatus 10 described above can be described as a machine learning method (or software) executed by a processor of a computer. In this machine learning method, the processor observes the machining state data CD of the machine tool 100, and the measurement data of the error δ between the target shape and the shape of the workpiece W machined by the machine tool 100 based on the workpiece model WM, as the state variable SV representing the current state of environment in which the workpiece W is machined; and learns the correction amount C in association with the error δ, using the state variable SV.

Figure 11:
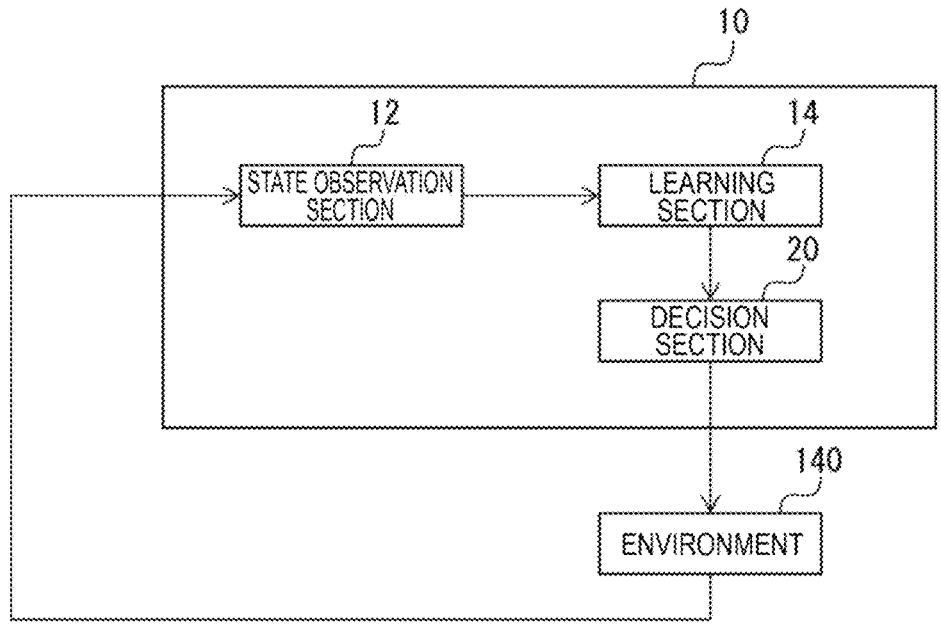
FIG. 11 is a block diagram of a machine learning apparatus according to still another embodiment.

FIG. 11 illustrates another embodiment of the machine learning apparatus 10. This machine learning apparatus 10 further includes a decision section 20. The decision section 20 outputs an output value of the correction amount C, based on the learning result (action value table) by the learning section 14. When the decision section 20 outputs an output value C, a state (error δ) of environment 140 in which the workpiece W is machined changes in response to the output value C.

Specifically, the decision section 20 outputs the output value C to the drawing device, and the drawing device creates the workpiece model WM2 by correcting the component (the model point, the model line, the surface model SM1) of the workpiece model WM1 in the model coordinate system CW in accordance with the output value C. Then, the program generation device generates the machining program MP2 based on the workpiece model WM2, and the machine tool 100 machines the workpiece W in accordance with the machining program MP2. The measuring device measures the error δ between the target shape and the shape of the machined workpiece W, and the state observation section 12 observes the state variable SV of the error δ as the measurement data in the next learning cycle.

The learning section 14 learns the correction amount C by updating e.g. the value function EQ (i.e., the action value table), using the changed state variable SV. The decision section 20 outputs the optimal output value C in response to the state variable SV, under the learned correction amount C. By repeating such a cycle, the machine learning apparatus 10 advances the learning of the correction amount C and gradually improves reliability of the correction amount C.

According to the machine learning apparatus 10 illustrated in FIG. 11, it is possible to change the state of the environment 140 by the output of the decision section 20. Note that, in the machine learning apparatus 10, the function of the decision section for reflecting the learning result by the learning section 14 in the environment 140 can be provided in an external device.

Next, a machining system 150 according to an embodiment will be described with reference to FIG. 12. The machining system 150 includes a machine tool 100, a drawing device 152, a program generation device 154, a measuring device 156, a sensor 158, and a control device 160. The drawing device 152 is a device capable of creating the workpiece model WM (e.g., CAD) as described above, and includes a computer having a processor and a memory, or software.

The program generation device 154 is a device capable of generating the machining program MP based on the workpiece model WM (e.g., CAM) as described above, and includes a computer having a processor and a memory, or software. Note that the drawing device 152 and the program generation device 154 may be integrated into a computer-aided design apparatus that is one computer including a processor and a memory. The measuring device 156 is a three-dimensional scanner including a stereo camera, a three-dimensional measuring machine, or the like, measures the error δ, and transmits the measurement data of the error δ to the control device 160, as described above.

The sensor 158 is configured to measure the dimensional error E, the temperature T1, the ambient temperature T2, the heat amount Q, the power consumption P, and the thermal displacement amount of the machining state data CD, and includes the deviation measuring device, the temperature sensor, the calorimeter, the power meter (the voltmeter or the ammeter), and the displacement measuring device, described above. The sensor 158 measures, as the machining state data CD, the dimensional error E, the temperature T1, the ambient temperature T2, the heat amount Q, the power consumption P, and the thermal displacement amount ξ, and transmits them to the control device 160.

The control device 160 includes a processor 162 CPU, GPU, etc.) and a memory 164 (ROM, RAM, etc.). The processor 162 is communicably connected to the memory 164 via the bus 166, and executes various calculations while communicating with the memory 164. The control device 160 is communicably connected to the machine tool 100 (specifically, the movement mechanism 136), the drawing device 152, the program generation device 154, the measuring device 156, and the sensor 158, and controls operations of these components.

In the present embodiment, the machine learning apparatus 10 is installed on the control device 160, and the processor 162 functions as the state observation section 12, the learning section 14 (the reward calculation section 16 and the function update section 18), and the decision section 20 described above. In addition, the processor 162 acquires the machining state data CD and the measurement data δ. Specifically, the processor 162 acquires, as the machining state data CD, the dimensional error E, the temperature T1, the ambient temperature T2, the heat amount Q, the power consumption P, and the thermal displacement amount ξ from the sensor 158.

Further, the processor 162 acquires the operation parameter OP as the machining state data CD. For example, the operation parameter OP (the acceleration α, the time constant τ, the control gain G, and the moment of inertia M) is pre-set by an operator, and stored in the memory 164. The processor 162 reads out the operation parameter OP from the memory 164 to acquire it. Also, the processor 162 acquires the measurement data of the error δ from the measuring device 156. Thus, in the present embodiment, the processor 162 functions as a state data acquisition section 168 configured to acquire the machining state data CD and the measurement data of the error δ.

The processor 162 functions as the machine learning apparatus 10 and can automatically advance learning of the correction amount δ in cooperation with the machine tool 100, the drawing device 152, the program generation device 154, the measuring device 156, and the sensor 158. For example, the processor 162 can learn the optimal correction amount δ by executing the learning flow illustrated in FIG. 8.

Note that the machining system 150 may further include a workpiece-handling robot (not illustrated). The workpiece-handling robot sets the workpiece-base-material stored in a predetermined place on the work table 114 of the machine tool 100, and after the workpiece-base-material is machined to be the workpiece W, the workpiece-handling robot takes out the machined workpiece W from the work table 114. Then, the workpiece-handling robot sets the machined workpiece W in the measuring device 156, and after the measuring device 156 measures the shape of the workpiece W and the error δ, the workpiece-handling robot takes out the workpiece W from the measuring device 156.

The processor 162 controls the workpiece-handling robot to execute loading and unloading of the workpiece W as described above. According to this configuration, the processor 162 can full-automatically execute the machine learning flow illustrated in FIG. 8 for example, without requiring a manual task by an operator.

On the other hand, the operator may manually perform at least one process in the machine learning flow. For example, the operator may manually create the workpiece model WM by operating the drawing device, or may manually create the machining program MP by operating the program generation device.

Note that, in the above-described embodiment, for ease of understanding, a case is described where there is one region F in which the error δ occurs. However, in practice, the error may occur in a plurality of regions Fi (i=1, 2, 3, ... ). In this case, the machine learning apparatus 10 executes the above-described machine learning method for each region Fi. For example, in the case of the machine learning apparatus 10 illustrated in FIG. 7, the machine learning apparatus 10 sequentially executes the flow illustrated in FIG. 8 for each region Fi. Thus, learning of the optimal correction amount C can be performed for each region Fi.

Figure 2:
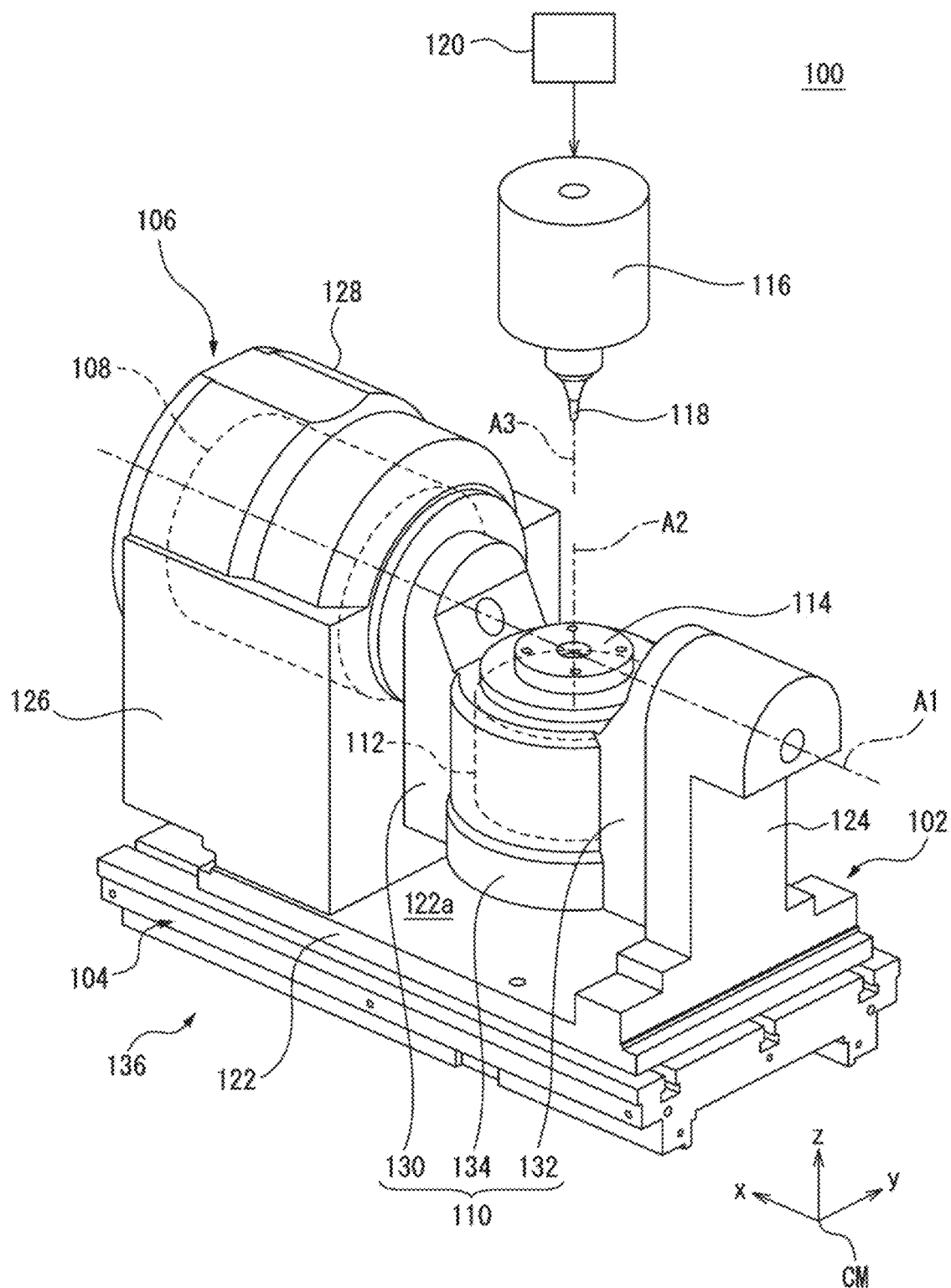
FIG. 2 is a perspective view of a machine tool according to an embodiment.
Figure 13:
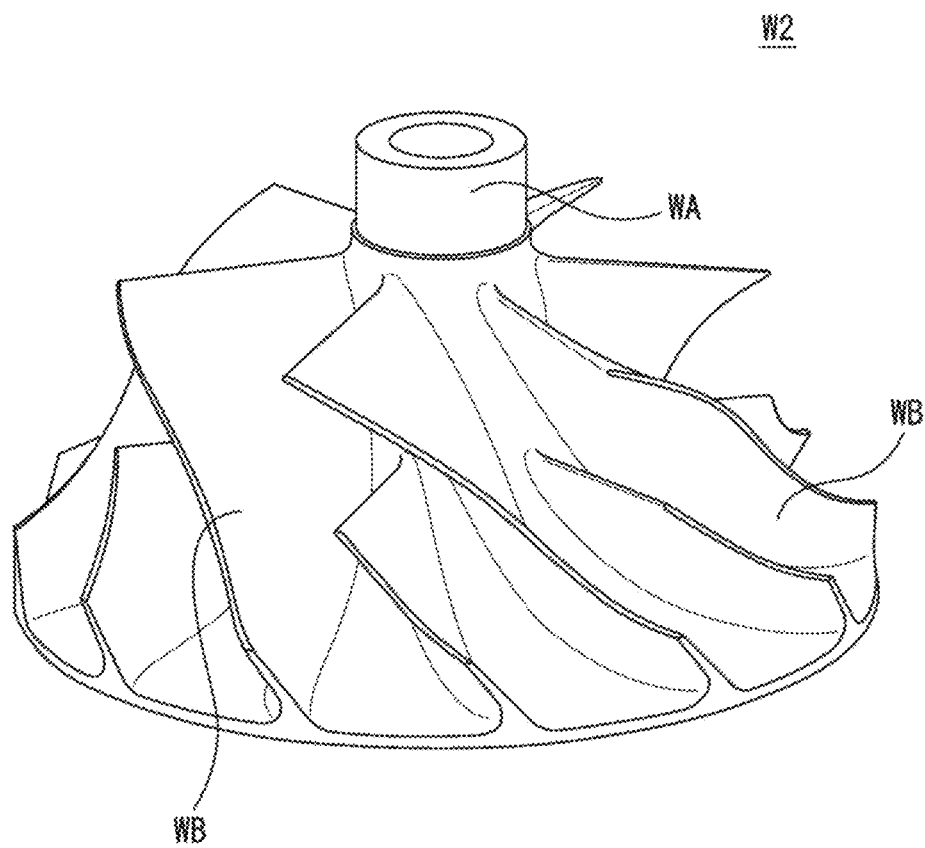
FIG. 13 illustrates another example of a workpiece produced by the machine tool illustrated in FIG. 2.

Note that, in the above-described embodiment, for ease of understanding, the workpiece W having a simple shape as illustrated in FIG. 2 is described as an example, but the shape of the workpiece is not limited. For example, the machine learning apparatus 10 can learn the optimal correction amount C by executing the above-described machine learning method, even for a workpiece W2 illustrated in FIG. 13. The workpiece W2 illustrated in FIG. 13 is an impeller used in a fluid device such as a compressor, and includes a base WA and a blade WB extending outward from the base WA in a curved shape. The workpiece W2 is machined by the machine tool 100.

Note that the machine tool 100 is not limited to the above-described configuration, but may be of any type. For example, the machine tool 100 is not limited to a machine tool that performs cutting by the tool 118, but may be a machine tool that includes a laser machining head and machines the workpiece W with a laser beam emitted from the laser machining head.

Also, instead of the above-described movement mechanism 136, a vertical articulated robot, a horizontal articulated robot, or a parallel link robot may be applied as a movement mechanism that relatively moves the tool 118 (or the laser machining head) and the workpiece W. In this case, the robot includes a drive section that rotationally drives the tool 118, and the machine tool 100 machines the workpiece W with the tool 118 while moving the tool 118 with respect to the workpiece W by the robot.

Figure 12:
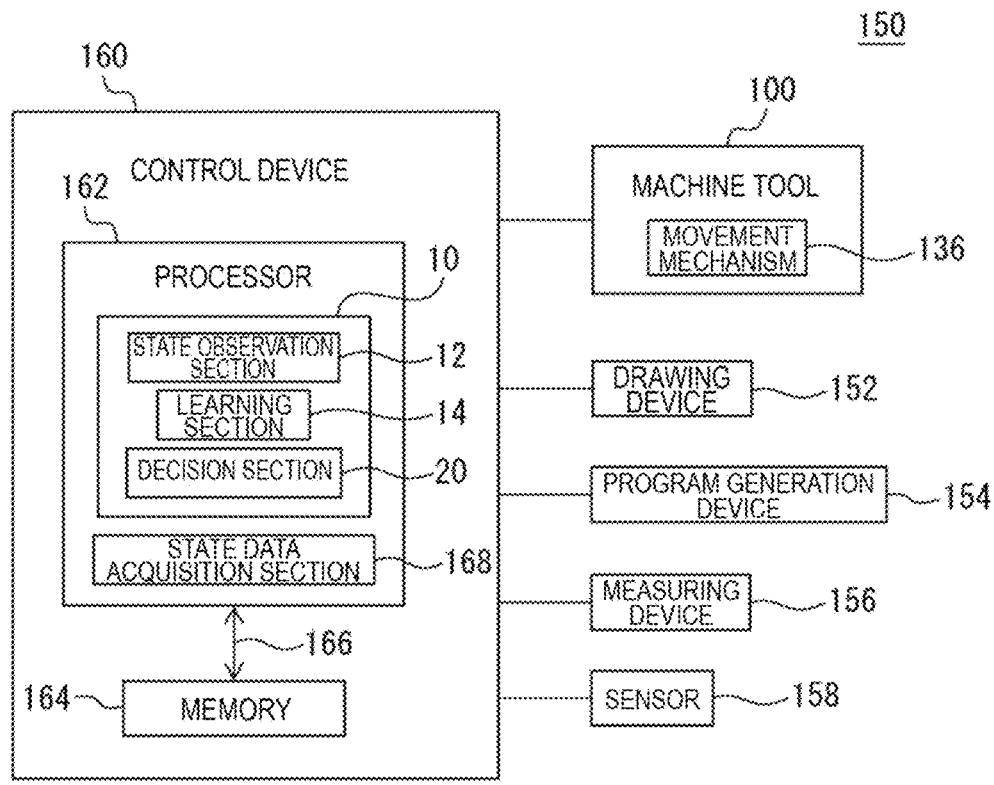
FIG. 12 is a block diagram of a machining system according to an embodiment.

Further, in the embodiment illustrated in FIG. 12, at least one of the drawing device 152 and the program generation device 154 may be, as software, integrated with the control device 160. Although the present disclosure is described above through the embodiments, the above-described embodiments do not limit the invention according to the claims. Note that the state observation section 12 may observe the correction amount C as the state variable SV. In this case, a correction amount acquisition section that acquires the correction amount C may be provided.

The invention claimed is:

1. A machine learning apparatus configured to learn a correction amount by which a workpiece model, which models a target shape of a workpiece as a Computer Aided Design (CAD) model, is to be corrected in order for a shape of the workpiece machined based on the workpiece model to coincide with the target shape, the machine learning apparatus comprising:
   a processor configured to learn the correction amount by repeatedly executing a following learning cycle (A)-(C):
   (A) randomly selecting a correction amount for correcting a first CAD workpiece model, which is an original version of the workpiece model, wherein the correction amount is randomly selected under a predetermined condition for limiting a magnitude and a direction of the correction amount;
   (B) observing (i) machining state data of a machine tool when the machine tool machines the workpiece based on a second CAD workpiece model, which is a next version of the workpiece model obtained by correcting the first CAD workpiece model by the randomly selected correction amount, and (ii) measurement data of an error between the target shape and a shape of the workpiece machined by the machine tool based on the second CAD workpiece model, as state variables; and
   (C) learning the correction amount for correcting a model component included in the workpiece model in association with the error, using the state variables.

2. The machine learning apparatus of claim 1, wherein the machining state data includes at least one of a dimensional error of the machine tool, a temperature of the machine tool, an ambient temperature around the machine tool, a heat amount of the machine tool, power consumption of the machine tool, a thermal displacement amount of the machine tool, and an operation parameter of the machine tool.

3. The machine learning apparatus of claim 2, wherein the machine tool includes:
   a tool configured to machine the workpiece; and
   a movement mechanism configured to move the tool and the workpiece relative to each other,
   wherein the operation parameter includes at least one of acceleration of the movement mechanism, a time constant that determines a time necessary for acceleration or deceleration of the movement mechanism, a control gain that determines a response speed of control for the movement mechanism, and a moment of inertia of the movement mechanism.

4. The machine learning apparatus of claim 1, wherein the processor is further configured to:
   obtain a reward relating to the error; and
   update a function representing a value of the correction amount, using the reward.

5. The machine learning apparatus of claim 4, wherein the processor is further configured to obtain the reward different in response to a magnitude of the error.

6. The machine learning apparatus of claim 1, wherein the processor is further configured to output an output value of the correction amount based on a learning result by the processor, and observe the state variables, using, as the measurement data in a next learning cycle, the error between the target shape and the shape of the workpiece machined by the machine tool based on the workpiece model corrected in accordance with the output value.

7. A control device configured to control a machine tool, comprising:

the machine learning apparatus of claim 1, wherein the processor is configured to acquire the machining state data and the measurement data.

8. A machining system comprising:

a machine tool configured to machine a workpiece;

a measuring device configured to measure an error between a shape of the workpiece machined by the machine tool and a predetermined target shape of the workpiece; and the control device of claim 7.

9. A machine learning method of learning a correction amount by which a workpiece model, which models a target shape of a workpiece as a Computer Aided Design (CAD) model, is to be corrected in order for a shape of the workpiece machined based on the workpiece model to coincide with the target shape, the machine learning method comprising:

repeatedly executing a following learning cycle (A)-(C):

(A) randomly selecting a correction amount for correcting a first CAD workpiece model, which is an original version of the workpiece model, wherein the correcting amount is randomly selected under a predetermined condition for limiting a magnitude and a direction of the correction amount;

(B) observing (i) machining state data of a machine tool when the machine tool machines the workpiece based on a second CAD workpiece model, which is a next version of the workpiece model obtained by correcting the first CAD workpiece model by the randomly selected correction amount, and (ii) measurement data of an error between the target shape and a shape of the workpiece machined by the machine tool based on the second CAD workpiece model, as state variables; and (C) learning the correction amount for correcting a model component included in the workpiece model in association with the error, using the state variables.

* * * * *